United States Patent [19]
Alexander

[11] Patent Number: 6,067,126
[45] Date of Patent: May 23, 2000

[54] METHOD AND APPARATUS FOR EDITING A VIDEO RECORDING WITH AUDIO SELECTIONS

[75] Inventor: Theresa A. Alexander, Hillsboro, Oreg.

[73] Assignee: Intel Corporation, Santa Clara, Calif.

[21] Appl. No.: 09/002,804

[22] Filed: Jan. 5, 1998

[51] Int. Cl.$^7$ .................................................... H04N 5/60
[52] U.S. Cl. ........................ 348/738; 348/722; 386/54; 386/97
[58] Field of Search .................................... 348/738, 722, 348/553; 386/97, 54; 345/978, 328

[56] References Cited

U.S. PATENT DOCUMENTS

| | | |
|---|---|---|
| 4,491,879 | 1/1985 | Fine . |
| 4,703,369 | 10/1987 | Moriyama et al. .......................... 386/97 |
| 5,099,377 | 3/1992 | Cary ............................................ 386/54 |
| 5,206,929 | 4/1993 | Langford et al. . |
| 5,262,877 | 11/1993 | Otsuka ....................................... 386/54 |
| 5,289,288 | 2/1994 | Silverman et al. ........................ 386/97 |
| 5,508,940 | 4/1996 | Rossmere et al. . |
| 5,548,346 | 8/1996 | Mimura et al. ........................... 348/738 |
| 5,636,073 | 6/1997 | Yamamoto et al. . |
| 5,715,412 | 2/1998 | Aritsuka et al. .......................... 345/978 |
| 5,835,671 | 11/1998 | Kitamura et al. ......................... 386/97 |
| 5,852,438 | 12/1998 | Tomizawa et al. . |

*Primary Examiner*—Victor R. Kostak
*Attorney, Agent, or Firm*—Blakely, Sokoloff, Taylor & Zafman LLP

[57] ABSTRACT

A method for editing a video recording includes receiving a signal including video content and analyzing the video content of the received signal to identify visual attributes which characterize the video content. Based, at least in part, on the identified visual attributes of the video content an audio selection with which to augment the received signal is identified from a plurality of available audio selections.

39 Claims, 8 Drawing Sheets

METHOD AND APPARATUS FOR EDITING A VIDEO RECORDING WITH AUDIO SELECTIONS

BACKGROUND OF THE INVENTION

1. Field of the Invention

The present invention relates to the field of entertainment systems and, in particular, to a method and apparatus for editing a video recording with audio selections.

2. Background Information

Numerous advances have been made in recent years in the field of consumer electronics in general, and entertainment systems in particular. Indeed, many households within the United States now have a television and a video recorder/playback device, e.g., a video cassette recorder, digital versatile disk (a.k.a digital video disk, or DVD), laser disk players, and the like. In addition, more and more households now have video camera's, also commonly referred to as a "cam-corder", with which to make their own movies, documenting in audio and video, a child's birthday, soccer games, vacations and the like. Similarly, although not entirely replacing "still" pictures, many weddings are now captured on video tape as well as in a photo album.

More advanced models of these prior art video camera's have features, which allow a user to edit and manipulate the recording. For example, some video camera's allow a user to manipulate the recording to add a title, or credits, at the beginning of the recording. Some video camera's permit a user to "fade in/fade out", e.g., slowly focus from a "fuzzy" picture to a clear picture, or from total blackness to a clear picture, and vice versa. Similarly, some of the more advanced video recorder/playback devices include features which allow a user to edit a recording to add a title or credits to a video recording.

None of the foregoing A/V devices, however, allow a user to edit a video recording to add audio content, e.g., a music soundtrack, a poem, sonnet or other enhancing audio without replacing the original audio content of the video recording. For example, if someone wanted to add background music to their video recording of the ocean, using home A/V equipment typical of the prior art, they would have to re-record the audio track of the video recording, thereby replacing the sound of the ocean with the "background" music, which becomes the primary audio content of the video recording. Those skilled in the art will recognize that an audio "mixer", e.g., a device which receives two signals and combines them into a composite signal, common of professional editing equipment may well solve this dilemma, allowing an editor to augment the video recording with audio. However, audio mixers typical of professional editing systems are expensive, difficult to install and use. That is, audio mixers typical of the prior art require that the user select audio content with which to augment the video recording, the user is required to synchronize the audio selection with the primary audio content, and to set the various levels (e.g., volume) of the audio.

Thus, even if the cost of such a professional mixer were not prohibitively expensive, a typical home entertainment system user would nonetheless find it exceedingly difficult to use a professional audio mixer to edit their home movies. Consequently, although it would be desirable to be able to add background music or other audio effects to home movies, the consumer electronics industry has heretofore failed to satisfy this need.

Thus, a need exists for a method and apparatus for editing a video recording with audio selections that is unencumbered with the foregoing deficiencies and limitations associated with the prior art.

SUMMARY OF THE INVENTION

In accordance with the teachings of the present invention, a method and apparatus for editing a video recording with audio selections is provided. In a first embodiment of the present invention, a method for editing a video recording includes receiving a signal including video content and analyzing the video content of the received signal to identify visual attributes which characterize the video content. Based, at least in part, on the identified visual attributes of the video content an audio selection with which to augment the received signal is identified from a plurality of available audio selections.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features have been omitted or simplified for ease of explanation. Furthermore, for ease of understanding, certain method steps are delineated as separate steps, however, these separately delineated steps should not be construed as necessarily order dependent in their performance.

Figure 1:
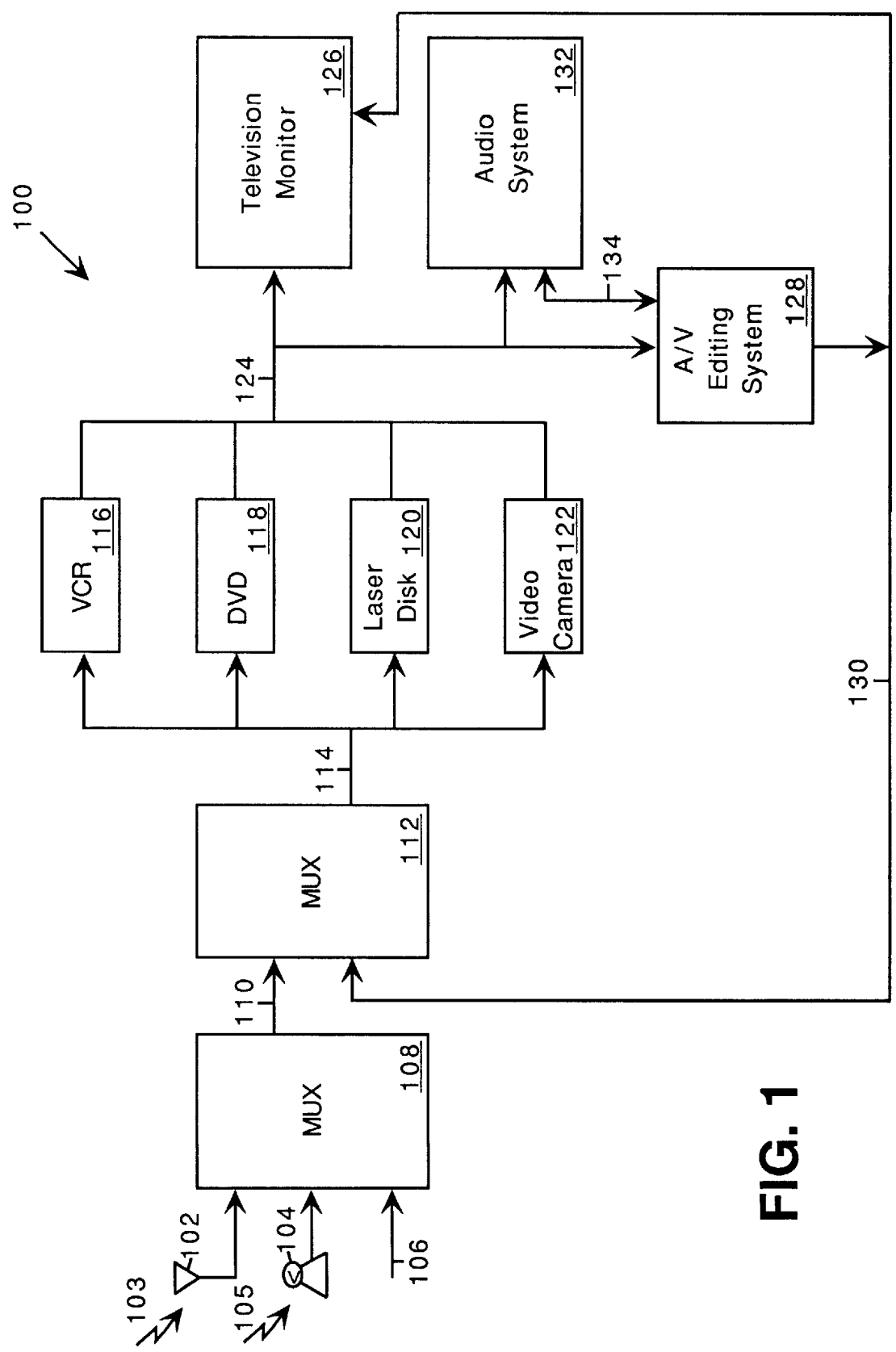
FIG. 1 is a block diagram illustrating an entertainment system incorporating the teachings of the present invention.

Turning to FIG. 1, a block diagram illustrating one example of an entertainment system incorporating the teachings of the present invention is depicted. In accordance with the illustrated embodiment of FIG. 1, entertainment system 100 is depicted including audio/video (A/V) editing system 128 incorporating the teachings of the present invention. As will be described in greater detail below, in accordance with one embodiment of the present invention, A/V editing system 128 receives a signal from a video recorder/playback device containing video content within a video stream and, optionally, audio content within an audio stream of the received signal (hereafter generally referred to as an A/V signal), whereupon A/V editing system 128 analyzes the video content of the received A/V signal identifying visual attributes which characterize the video content and, based at least in part on the identified visual attributes, A/V editing system 128 identifies an appropriate audio selection from a plurality of available audio selections with which to augment the received A/V signal. Accordingly, one skilled in the art will appreciate that entertainment system 100 including the innovative A/V editing system 128 provides a user of such an entertainment system with the means to automatically edit and enhance home movies and other video recordings with automatically chosen audio selections.

As depicted in the illustrated example embodiment of FIG. 1, A/V editing system 128 may well be utilized with a wide variety of A/V components. In accordance with FIG. 1, entertainment system 100 is shown comprising signal routing multiplexers 108 and 112, a plurality of video recorder/playback devices, e.g., video cassette recorder/player (VCR) 116, digital versatile disk (a.k.a. digital video disk, or DVD) 118, laser disk 120, video camera 122 and the like, television/monitor 126 and a plurality of audio components cumulatively referenced as audio system 132, each communicatively coupled within system 100 as depicted in FIG. 1. Except for A/V editing system 128 incorporated with the teachings of the present invention, each of the elements of system 100 are intended to represent a wide variety of commonly available A/V components and, insofar as their respective functions and features are well known in the art, they need not be further described here.

As illustrated in entertainment system 100 of FIG. 1, the A/V signal may emanate from any of a number of sources. In the illustrated example embodiment of FIG. 1, entertainment system 100 is capable of receiving an A/V signal from wireless sources and/or wireline sources. That is, A/V editing system 128 may receive the A/V signal via any of a number of broadcast sources including, for example, television broadcasts 103 received by antenna 102, or satellite broadcasts 105 received by satellite dish antenna 104. Similarly, entertainment system 100 also receives A/V signals from wireline sources such as, for example, Internet resources, intranet resources and cable television broadcasts via line 106. Thus, in accordance with the illustrated embodiment of FIG. 1, line 106 is intended to represent any of a variety of wireline transport medium including, but not limited to, a plain old telephone services (POTS) line, an Integrated Services Digital Network (ISDN) line, a cable line, an Ethernet line, a T1/E1 line, etc. providing an A/V signal from a corresponding variety of wireline services. Similarly, A/V editing system 128 may receive the A/V signal from any of the plurality of video recorder/playback devices (116–122), described above. In an alternate embodiment, television/monitor 126 and A/V editing system 128 may well receive a broadcast A/V signal directly from the individual antenna/wireline sources, or from MUX 108 via line 110. Consequently, those skilled in the art will appreciate that system 100 is but an example intended to illustrate the diverse nature of signal sources available to A/V editing system 128, and that systems of greater or lesser capability may well be substituted without deviating from the spirit and scope of the present invention.

In one embodiment, A/V editing system 128 may be a computer system incorporated with the teachings of the present invention, as will be discussed further with respect to FIG. 7, below. In another embodiment, A/V editing system 128 may be a "set-top" box endowed with the necessary processing power and incorporated with the teachings of the present invention. Alternatively, A/V editing system 128 may well be incorporated into individual elements within system 100 (e.g., television system, or video cassette recorder). Thus, in accordance with the illustrated example embodiment of FIG. 1, system 100 is intended to represent any of a number of entertainment systems found in many homes that are capable of receiving an A/V signal from any of a number of alternate sources.

Figure 2:
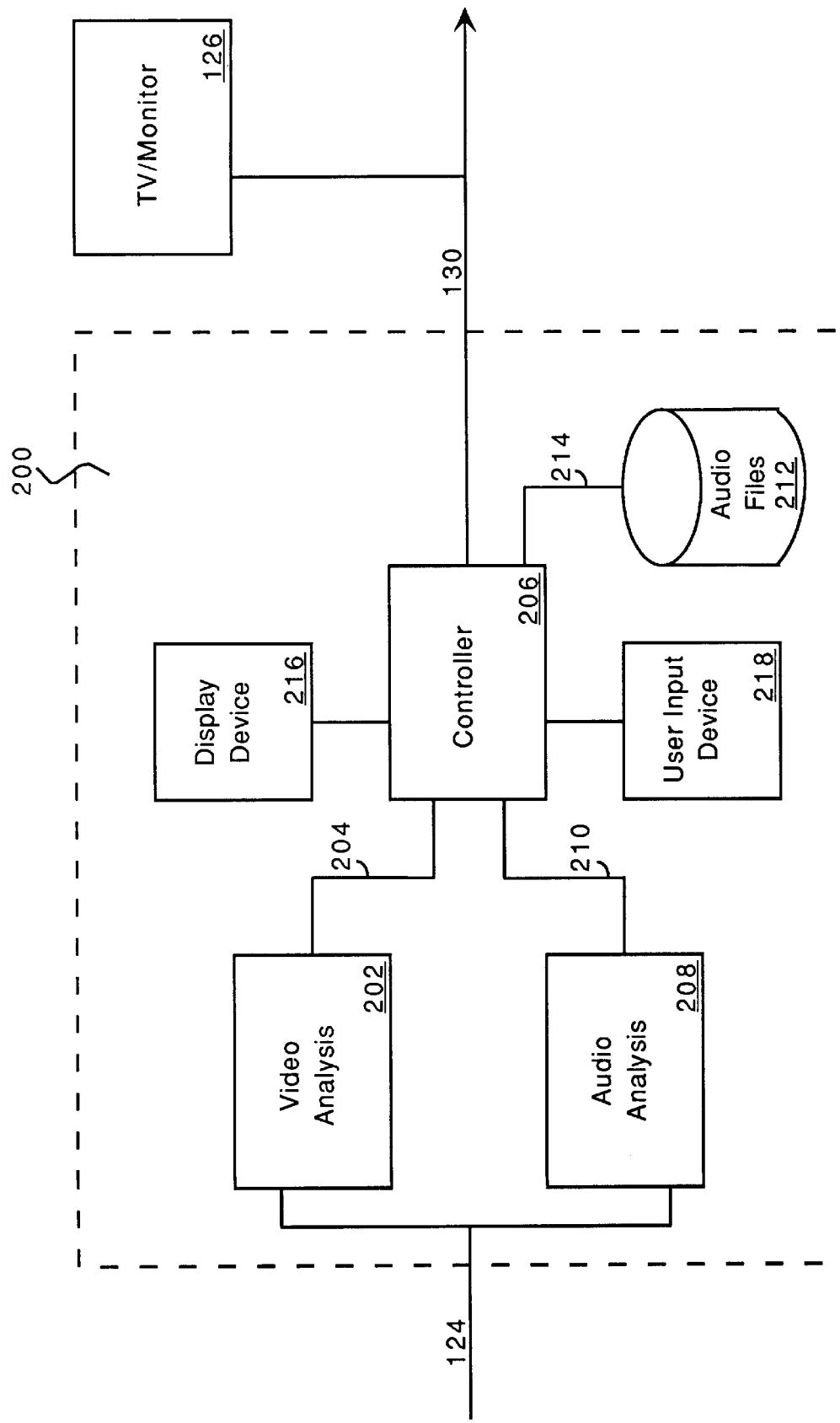
FIG. 2 is a block diagram of an A/V editing system, in accordance with one embodiment of the present invention.

Having introduced the concept of the innovative A/V editing system 128 above within the context of entertainment system 100, FIG. 2 provides a block diagram which illustrates one example architecture of A/V editing system 200 suitable for use in entertainment system 100, incorporating the teachings of the present invention. In the illustrated example embodiment of FIG. 2, A/V editing system 200 is shown comprising video analysis module 202, audio analysis module 208, controller 206, display device 216, user input device 218 and audio files 212, each of which being communicatively coupled as depicted. Although audio files 212 are depicted in the illustrated example embodiment of FIG. 2 as being external to controller 206, those skilled in the art will appreciate that such audio files may well be stored in a mass storage device (not shown) within controller 206. Further, those skilled in the art will appreciate that in alternate embodiments, audio files 212 may well be located in a remote location accessible via the Internet and line 106, or audio files 212 may well be located in an audio system (e.g., audio system 132), wherein line 214 represents the interconnection between A/V editing system 200 and the audio system. Similarly, in an alternate embodiment, display device 216 may be removed by using television (TV)/monitor 126 as the video display for A/V editing system 200.

Figure 3:
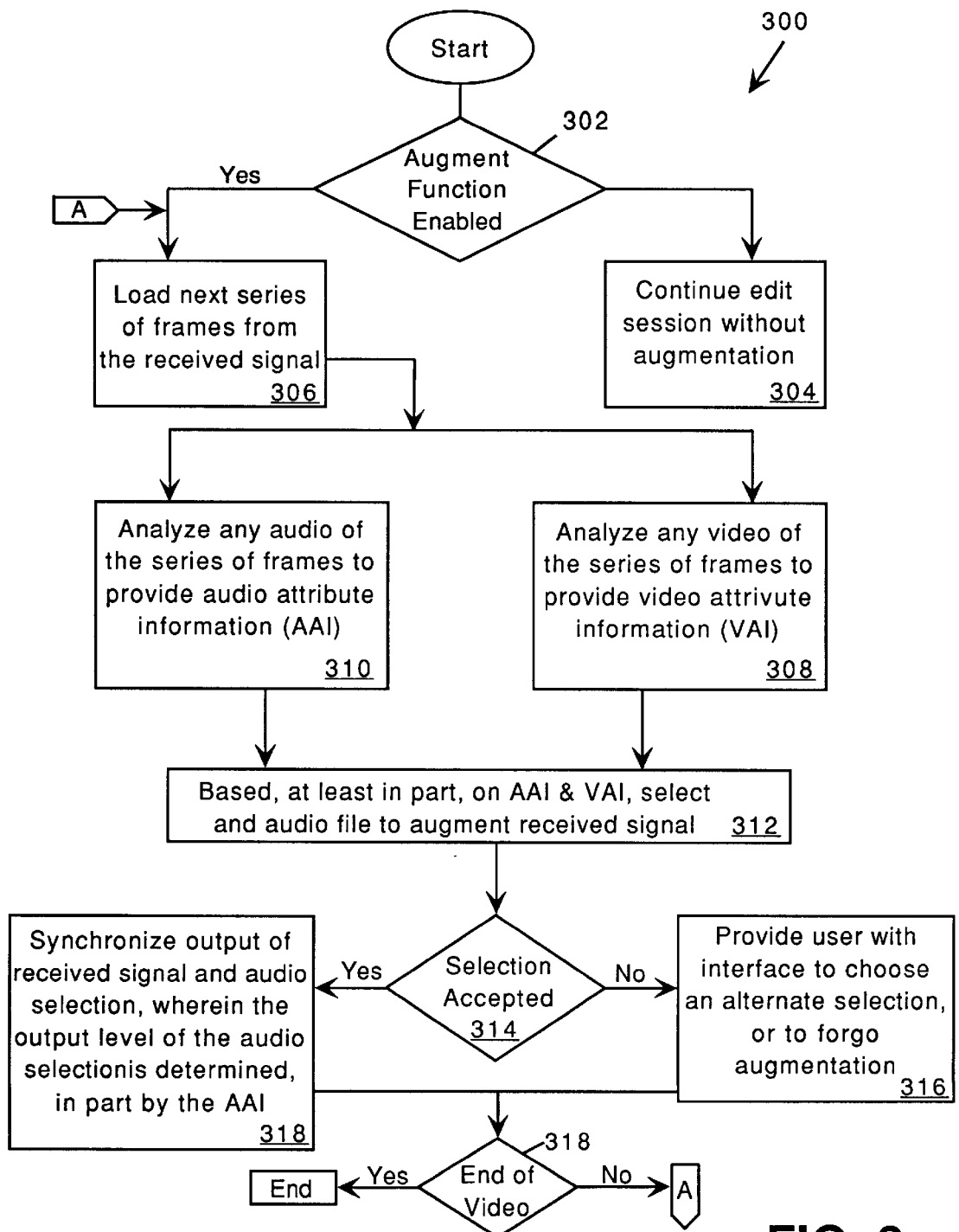
FIG. 3 illustrates a flow chart of one example of a method for automatically augmenting a video recording with an audio selection, in accordance with the teachings of the present invention.

Given the architectural description of the example A/V editing system provided in FIG. 2, one example method for automatically augmenting a video recording with an audio selection, in accordance with the teachings of the present invention, will be developed with reference to the flow chart depicted in FIG. 3. In particular, for ease of explanation and not limitation, the operation of A/V editing system 200 will be developed with reference to FIG. 3 and continued reference to FIG. 2. As illustrated in FIG. 3, the example method of automatically augmenting a video recording with an audio selection begins with the initial step of determining whether the augmenting function is enabled, step 302. That is to say, in one embodiment, a user of A/V editing system 200 may disable the audio augmentation feature via user input device 218. If, in step 302, it is determined that the audio augmentation feature of A/V editing system 200 has been disabled, the editing session continues without automatic audio augmentation, step 304.

If, however, the audio augmentation feature of A/V editing system 200 is enabled, A/V editing system 200 loads a predetermined amount of the video recording via an A/V signal for analysis, step 306. In one embodiment, A/V editing system 200 loads the entire video recording into buffers (not shown) within video analysis module 206 and audio analysis module 208 for analysis and audio augmentation. In an alternate embodiment, A/V editing system 200 loads a subset of the entire video recording for analysis and augmentation. More specifically, in accordance with the latter embodiment, A/V editing system 200 loads two to three minute segments, i.e., samples, of the video recording into the buffers for analysis and augmentation, wherein the length of the sample corresponds to an average length of an audio file in audio files 214. In another embodiment, A/V editing system 200 loads individual scenes of the video recording into buffers. In one embodiment, A/V editing system 200 performs an initial analysis of the video recording to identify each of a plurality of scenes comprising the video recording, and incrementally loads individual scenes in the analysis buffer for audio augmentation, to be described more fully below.

Having loaded the predetermined amount of the video recording via an A/V signal for analysis in step 306, the received A/V signal is simultaneously analyzed by video analysis module 202 and audio analysis module 208, in steps 308 and 310, respectively. That is, in accordance with the illustrated embodiment of FIG. 3, the A/V signal is simultaneously provided to video analysis module 202 which analyzes the video content of the A/V signal, as well as audio analysis module 208 which analyzes the audio content of the A/V signal. In particular, video analysis module 202 analyzes the video content embedded within the video stream of the received A/V signal and characterizes the video content in terms of any of a number of visual attributes, step 308. In one embodiment, video analysis module 202 "splits" the received video stream into a number of quantization regions, or quadrants, and analyzes the video content within each of the quantization regions of the video stream. One example of a video stream broken into such quantization regions is depicted in the illustration of FIG. 4.

Figure 4:
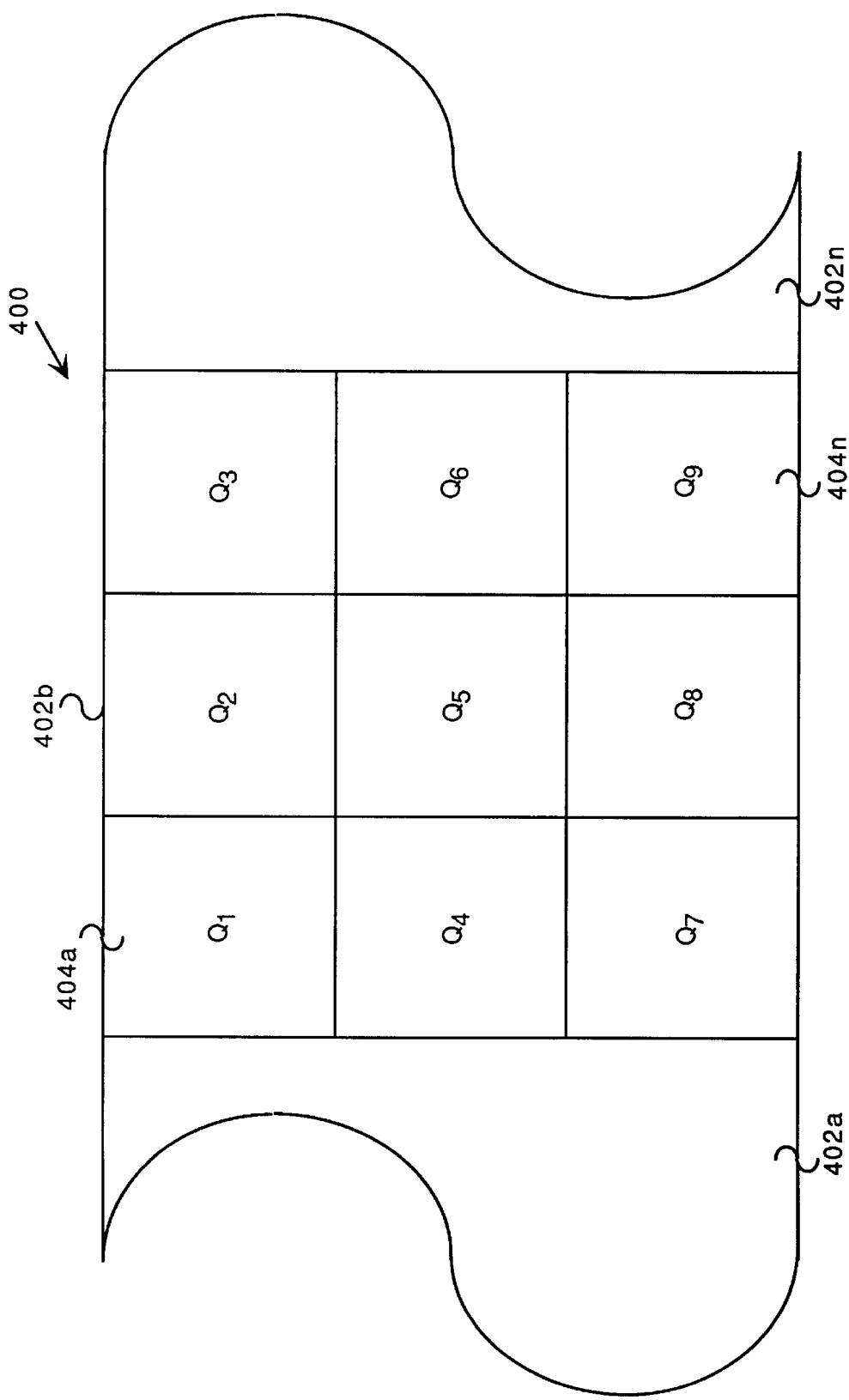
FIG. 4 is an illustration of one example of a video channel of a received A/V signal depicting quantization fields used to characterize the visual attributes of the A/V signal, in accordance with one embodiment of the present invention.

Jumping ahead to FIG. 4, an illustration of a video stream with its corresponding quantization regions is depicted. In particular, video stream 400 is shown comprising a number of "frames" (e.g., a predetermined amount of the video stream) of the video stream referenced as 402a, 402b through 402n, respectively. As illustrated in FIG. 4, the quantization regions of frame 402b are depicted as quantization region 1 ($Q_1$) 404a through quantization region 9 ($Q_9$) 404n. Thus, in accordance with one example embodiment of the present invention, video analysis module 202 analyzes the video content within each of the quantization regions of each frame of the video stream to characterize the video content in terms of its visual attributes.

In one embodiment, for example, video analysis module 202 analyzes each of the quantization regions 404a through 404n of video stream 400 for color attributes, e.g., whether the video content of the received A/V signal is a "cool" color (blues, whites), a "hot" color (reds, yellows), or a "warm" or "earthy" color (browns, oranges), etc. and output on a scale of 0 ("cool" (white)) to 10 ("hot" (red)), with appropriate gradations in between. In another embodiment, video analysis module 202 analyzes each of the quantization regions 404a through 404n of video stream 400 for lighting visual attributes, e.g., whether the video content is "bright" or "dark". In another embodiment, video analysis module 202 analyzes each of the quantization regions 404a through 404n of video stream 400 for content and motion visual attributes, e.g., whether the video contains cityscape or a countryside, whether the video contains people and whether they are active or sedentary. One example of a system for quantizing the motion/action within video content is described in copending U.S. patent application Ser. No. 08/918,681 entitled "Bit-Rate Control of Video Data Compression" by Adnan Allatar, commonly assigned to the assignee of the present invention. In yet another embodiment, video analysis module 202 analyzes quantization regions 404a through 404n of video stream 400 for each of the above mentioned visual attributes.

Returning to the illustrated example method depicted in FIG. 2, in addition to the video analysis of step 308, audio analysis module 208 analyzes the audio content (hereafter, primary audio content), if any, received in the audio stream of the received A/V signal and identifies audio attribute information which characterizes the primary audio content embedded within the audio stream, step 310. For the illustrated embodiment, the purpose of identifying audio attribute information in step 310 is to set the level, e.g., volume, of the augmented audio selection thereby ensuring that the primary audio content, if any, is not "smothered" or "drowned out" by the relative level of the augmented audio selection. One example method for analyzing the primary audio content of the received A/V signal (e.g., step 310) is shown in FIG. 5.

Figure 5:
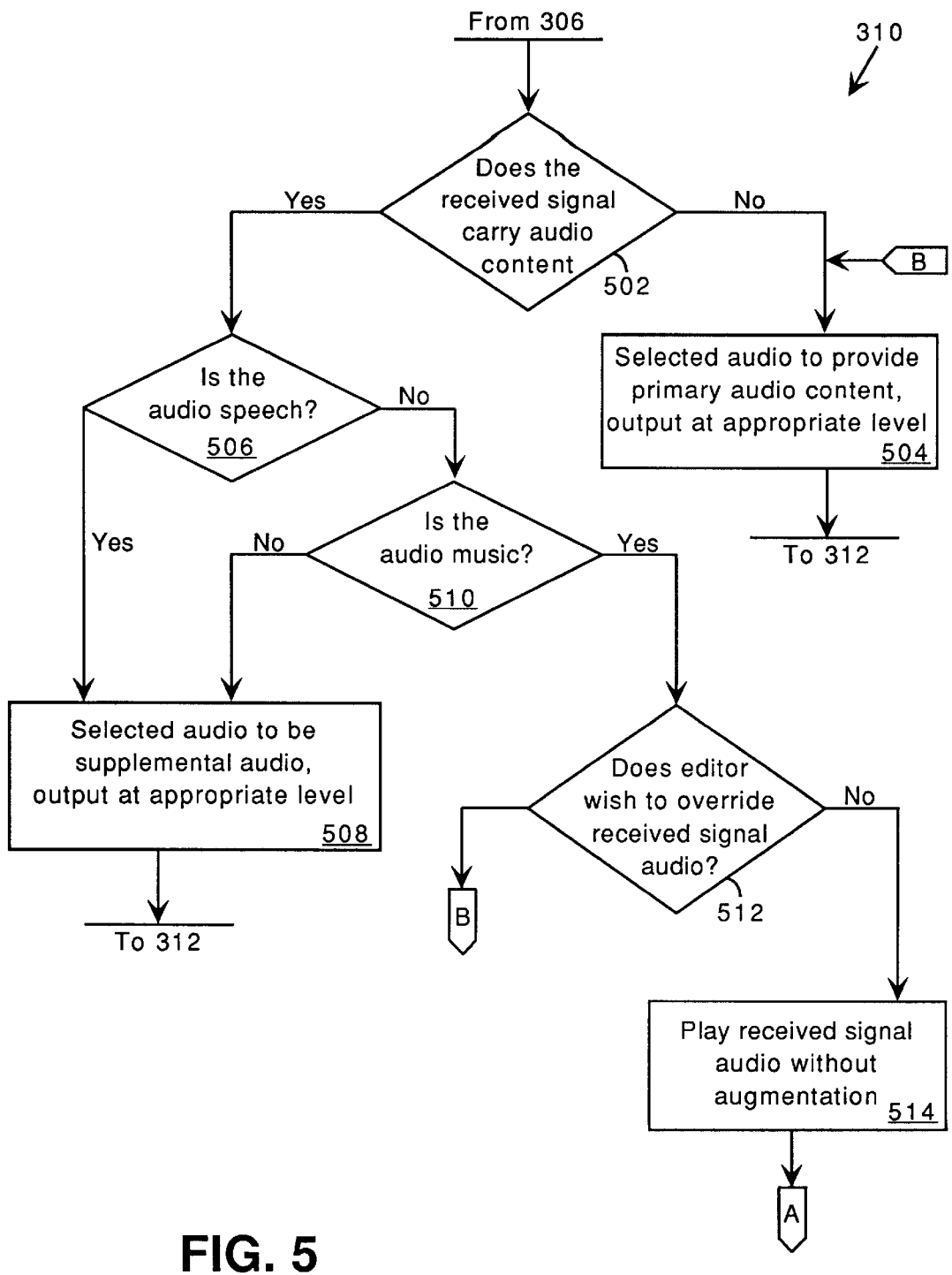
FIG. 5 illustrates a flow chart of one example of a method for automatically characterizing the primary audio content of a video recording, in accordance with one embodiment of the present invention.

Referring to FIG. 5, one example method for analyzing the primary audio content of the received A/V signal is depicted, in accordance with one embodiment of the present invention. In the illustrated example embodiment of FIG. 5, the audio analysis begins with audio analysis module 208 determining whether the received A/V signal includes an audio stream containing audio content (i.e., primary audio content), step 502. If audio analysis module 208 determines that the audio stream does not carry any audio content, an indication that the audio selection ultimately chosen by A/V editing system 200 will provide the only audio content for the recording, audio analysis module 208 provides a level indication to controller 206 via line 214, step 504. In such a circumstance, the level indication will set the volume of the audio selection chosen by A/V editing system to a "high" level, as it will provide the only audio content for this segment of the video recording. If, however, audio analysis module 208 determines that the received A/V signal does contain audio content, step 502, audio analysis module 208 next determines whether the primary audio content contains speech, step 506. In one embodiment, audio analysis module 208 employs any of a number of available speech recognition devices with which to perform this task.

If, in step 506, audio analysis module 208 determines that the primary audio content consists of speech, audio analysis module 208 issues a level indication to controller 206 via line 214 that ensures the speech will not be drowned out, step 508. Alternatively, if in step 506 audio analysis module 208 determines that the primary audio content is not speech, a determination is made in step 510 as to whether the primary audio content consists of music. In one embodiment, audio analysis module 208 analyzes the relative levels and breadth of frequency spectrum that characterizes the primary audio content in making this determination. For example, a spectral analysis wherein the primary audio content spans a broad frequency spectrum with large gradients within the spectrum that fluctuate over time, provides an indication that the primary audio content consists of music. In an alternate embodiment, audio analysis module 208 may be pre-programmed with a number of music selections with which to compare the received primary audio content.

Regardless of the method of analysis, if audio analysis module 208 determines that the primary audio content is not music, step 510, having already determined that the primary audio content is not speech, audio analysis module 208 determines that the audio selection ultimately chosen by A/V editing system 200 is to be background audio and, consequently, issues a level indication to controller 206 via line 214 to ensure that the primary audio content is not "smothered" by the background audio selection, step 508, If, however, audio analysis module 208 determines in step 510 that the primary audio content does consist of music, audio analysis module 208 provides this audio attribute information to controller 206 via line 214. Subsequently, controller 206 prompts the user of A/V editing system 200 via display device 216 with the option of overwriting the primary audio content (e.g., the music). For continuity and ease of explanation only, the function wherein controller 206 provides the user of A/V editing system 200 with this option is presented in the illustrated embodiment of FIG. 5 as step 512, although those skilled in the art will appreciate that this step may well be completed later in method 300 of FIG. 3.

If the user elects to overwrite the primary audio content of the received A/V signal, the audio selection chosen by A/V editing system 200 becomes the primary audio content of the composite signal generated by A/V editing system 200 and is, accordingly, set to an appropriate level, step 504. However, if in step 512, the user of A/V editing system 200 elects not to override the primary audio content consisting of music, the editing session continues without audio augmentation of this predetermined amount of the received A/V signal, step 514.

Therefore, in accordance with one embodiment of the present invention, the content of the audio stream is merely analyzed for purposes of setting a level with which to augment the received A/V signal. That is, in the illustrated example embodiment, the function of audio analysis module 208 is to identify the audio attributes of the primary audio content to ensure that the recording level (e.g., volume) of the augmented audio set by controller 206 does not "smother" the primary audio content. Those skilled in the art will appreciate, however, that in other embodiments, analysis of the audio content may well server additional functions without deviating from the spirit or scope of the present invention.

Continuing with the example method of FIG. 3, having received visual attribute information from video analysis module 202 in step 308, controller 206 identifies an appropriate audio selection from a plurality of audio selections contained within audio files 212 based, at least in part, on the received visual attribute information, step 312. In one embodiment, controller 206 relies on a database which references appropriate audio selections based on any of a number of corresponding visual attributes. One example of a database suitable for use by controller 206 is depicted in FIG. 6.

Figure 6:
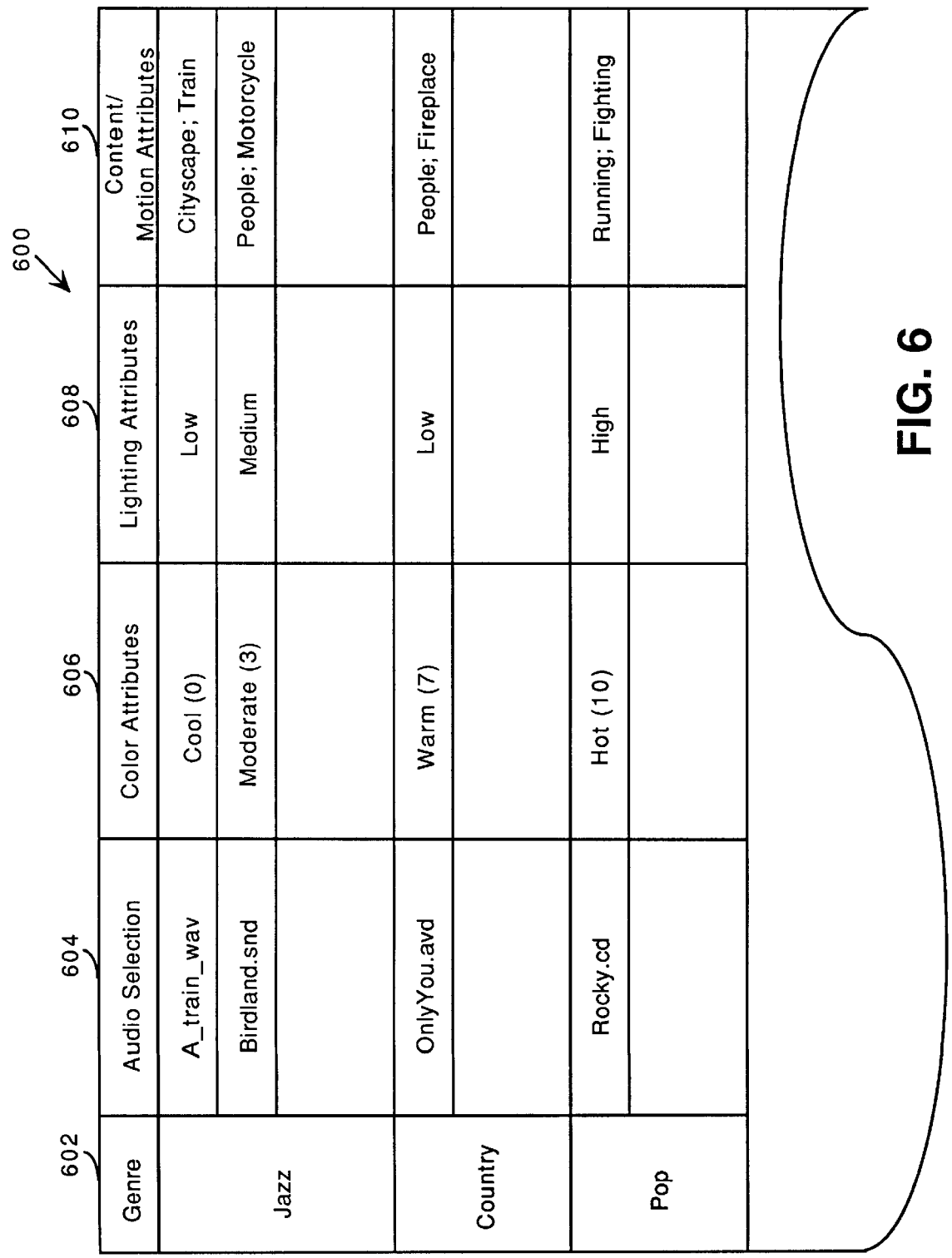
FIG. 6 is an illustration of one example of an audio selection database, in accordance with one embodiment of the present invention.

In accordance with the illustrated example embodiment of FIG. 6, database 600 is shown comprising a number of audio selections cross referenced with a number of visual attributes. As depicted in the illustrated example embodiment of FIG. 6, database 600 references audio selections against corresponding visual attributes in a two-dimensional database. In the illustrated embodiment, the y-axis is characterized by identifying the genre 602 of the audio selections. Those skilled in the art will appreciate that genre information 602 is but one of a number of alternative means by which the information within database 600 may be organized. Thus, a number of suitable alternative approaches exist for organizing the information of database 600, without departing from the spirit or scope of the present invention.

The x-axis of database 600 is characterized by audio selections 604 cross referenced against corresponding visual attributes such as, for example, color attributes 606, lighting attributes 608 and content/motion attributes 610. In accordance with one embodiment of the present invention, A/V editing system 200 may be preloaded with a number of audio selections, wherein the audio selections stored within database 600 are cross referenced against the various attribute information. In another embodiment, A/V editing system 200 provides a user interface through which audio selections may be added to or deleted from audio files 212, wherein controller 206 automatically updates database 600 with the additions/deletions, as appropriate. Further, those skilled in the art will appreciate that although database 600 is depicted as a two-dimensional database, this is for ease of explanation only. That is, databases of greater or lessor complexity may be beneficially substituted for database 600, with a corresponding effect on the amount and complexity of the information contained therein.

Returning to the illustrated embodiment of FIG. 3, having automatically chosen an audio selection with which to augment the video recording based, at least in part, on the identified visual attributes of the video recording in step 312, controller 206 prompts the user of A/V editing system 200 with the option of accepting the controllers audio selection, or rejecting it in favor of another selection, step 314. If, in step 314, the user accepts the audio selection of controller 206, controller 206 synchronizes the audio selection with the video recording, mixing the audio selection with the primary audio content, if any, at levels automatically determined by audio analysis module 208, as appropriate, and outputs a composite signal comprising the received A/V signal augmented with the automatically identified audio selection. In one embodiment, while mixing the automatically identified audio selection with the primary audio content, controller 206 coordinates the "tempo" (e.g., speed) of the audio selection with the rate of motion identified in the video content, or with the tempo of the primary audio content.

If, however, the user rejects the audio selection of controller 206 in step 314, the user is provided with an interface through which the user can access database 600 of the available audio selections, wherein the user chooses an audio selection with which to augment the video recording, step 316. In step 318, controller 206 determines whether the end of the video recording has been reached. If so, the method ends. Alternatively, if controller 206 determines that the end of the video recording has not yet been reached, the method continues with step 306, and the next predetermined amount of video for editing is loaded in A/V editing system 200, as appropriate.

Therefore, in accordance with the teachings of the present invention, A/V editing system 200 analyzes the video content of a received A/V signal and characterizes the video content in terms of a number of visual attributes. Additionally A/V editing system 200 analyzes the audio content of the received A/V signal, e.g., primary audio content, to automatically identify a level at which to "mix" the audio selection with the primary audio content. Having developed the visual attribute information, A/V editing system 200 chooses an audio selection from a plurality of available audio selections based, at least in part, on the identified visual attribute information. Having identified an audio selection with which to augment the primary audio content, upon receiving user approval A/V editing system 200 "mixes" the audio selection with the primary audio content at a level automatically determined in accordance with determined audio attribute information of the audio stream. In accordance with one embodiment of the present invention, the audio selection is a musical composition, e.g., a song. In an alternate embodiment, the audio selection is a poem, a sonnet or another lyrical composition that is automatically selected by A/V editing system 200 to enhance the mood depicted by the visual attributes of the received A/V signal.

In accordance with one embodiment of the present invention, A/V editing system 200 is a computer system appropriately configured to analyze a video stream and characterize the video content of a received A/V signal in terms of its visual attributes and based, at least in part, on those visual attributes the computer system identifies an audio selection with which to augment the received A/V signal, and generates a composite of the received A/V signal and the automatically identified audio selection for recording. As will be described in greater detail below, A/V editing system 200 is intended to represent a broad category of computer systems known in the art. An example of such a computer system is a desktop computer system equipped with a high performance microprocessor(s), such as the Pentium® processor, Pentium® Pro processor, or Pentium® II processor manufactured by and commonly available from Intel Corporation of Santa Clara, Calif.; including any of a number of audio and video input and output peripherals/ interfaces for receiving, digitizing, compressing and decompressing audio and video signals. It is to be appreciated that the housing size and design for A/V editing system 200 may be altered, allowing it to better visually fit within an entertainment system, e.g., entertainment system 100. Accordingly, A/V editing system 200 may well be embodied within a "set-top" box incorporated with the teachings of the present invention.

Figure 7:
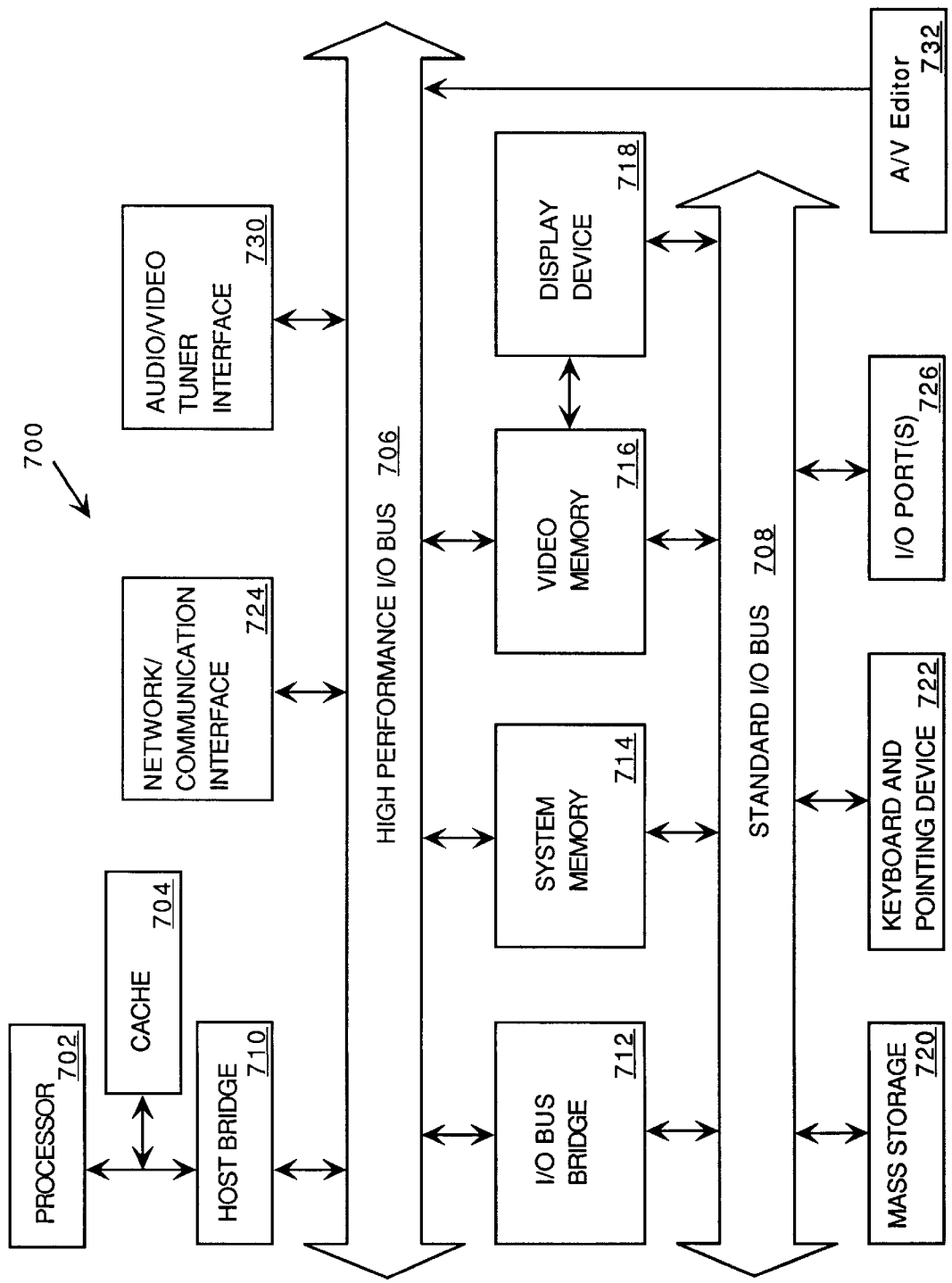
FIG. 7 is a block diagram of an example computer system suitable for use as an A/V editing system, in accordance with one embodiment of the present invention.

FIG. 7 provides a block diagram of a computer system (e.g., system 700) incorporated with the teachings of the present invention. In one embodiment, system 700 is A/V editing system 128 of FIG. 1. In the illustrated embodiment, system 700 includes at least one processor (e.g., processor 702) and cache memory 704 coupled to each other as shown. Additionally, system 700 includes high performance input/ output (I/O) bus 706 and standard I/O bus 708, as shown. Host bridge 710 couples processor 702 to high performance I/O bus 706, whereas I/O bus bridge 712 couples high performance I/O bus 706 to standard I/O bus 708. Coupled to high performance I/O bus 706 are network/ communication interface 724, system memory 714, audio/ video interface board 730, A/V editor 732 and video memory 716. In turn, display device 718 is coupled to video memory 716. Coupled to standard I/O bus 708 are mass storage device 720 keyboard and pointing device 722, and I/O ports 726. In one embodiment, keyboard and pointing device are coupled to standard I/O bus 708 with a serial communication interface cable, while in alternate embodiments it may be communicatively coupled with an infrared (IR) interface or a radio-frequency (RF) interface.

With continued reference to FIG. 7, elements 702–730 perform their conventional functions as known in the art. In particular, network/communication interface 724 is used to provide communication between system 700 and any of a wide range of conventional networks, such as Ethernet, token ring, the Internet, etc. Similarly, audio/video interface board 730 is used to receive broadcast communications from any of a wide range of conventional wireline and wireless broadcast media such as RF broadcasts, satellite broadcasts, cable broadcasts, etc. Mass storage device 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to system 700 (e.g., stereo, speakers, etc.). Collectively, the elements coupled to system 700 are intended to represent a broad category of hardware systems, including but not limited to general purpose computer systems based on the Pentium® processor, the Pentium® Pro processor, or the Pentium® II processor commonly available from Intel Corporation of Santa Clara, Calif.

In one embodiment, A/V editor 732 includes video analysis module 202 and audio analysis module 208 of A/V editing system 200, while controller 206, display device 216 and user interface device 218 of A/V editing system 200 correspond to processor 702, display device 718 and keyboard and pointing device 722, respectively, of system 700 of FIG. 7. In one embodiment, audio files 216 are stored on mass storage 720, or are remotely located and communicatively coupled to system 700 via networkl/communication interface 724. In one embodiment, system 700 receives an A/V signal from network/commnunication interface 724 and/or audio/video tuner interface 730, analyzes the video content for visual attribute information, and automatically identifies an audio selection with which to augment the received A/V signal, in accordance with the teachings above. In an alternate embodiment, system 700 receives an A/V signal via an antennae (not shown) coupled to one of I/O ports 726 and automatically identifies an appropriate audio selection with which to augment the received A/V signal.

It is to be appreciated that various components of system 700 may be re-arranged. For example, cache 704 may be on-chip with processor 702. Alternatively, cache 704 and processor 702 may be packed together as a "processor module", with processor 702 being referred to as the "processor core". Furthermore, mass storage device 720, keyboard and pointing device 722, and/or display device 718 and video memory 716 may not be included in system 700. Additionally, the peripheral devices shown coupled to standard I/O bus 708 may, in alternate embodiments, be coupled to high performance I/O bus 706; or, in some implementations only a single bus may exist with the components of system 700 being coupled to the single bus. Furthermore, additional components may be included in system 700, such as additional processors, storage devices, or memories.

In one embodiment, rather than including a separate A/V editor 732, the innovative features of the present invention discussed above may be implemented as a series of software routines run by system 700 of FIG. 7. These software routines run a plurality or series of instructions to be executed by a processor, such as processor 702 in system 700. Initially, the series of instructions are stored on a storage device, such as mass storage device 720. It is to be appreciated that the series of instructions may be stored on any conventional storage device, such as a diskette, CD ROM, magnetic tape, digital versatile disk (DVD) (also referred to as a digital video disk), laser disk, ROM, flash memory, etc. It is also to be appreciated that the series of instructions need not be stored locally, and could be received from a remote storage device, such as a server on a network, via network/commmunication interface 724. The instructions are copied from the storage device, such as mass storage device 720, into system memory 714 and then accessed and executed by processor 702. In one embodiment, these software routines are written in the C++ programming language. It is to be appreciated, however, that these routines may be implemented in any of a wide variety of programming languages. In alternate embodiments, the present invention may be implemented in discrete hardware or firmware. For example, an application specific integrated circuit (ASIC) could be programmed with the above described functions of the present invention.

Figure 8:
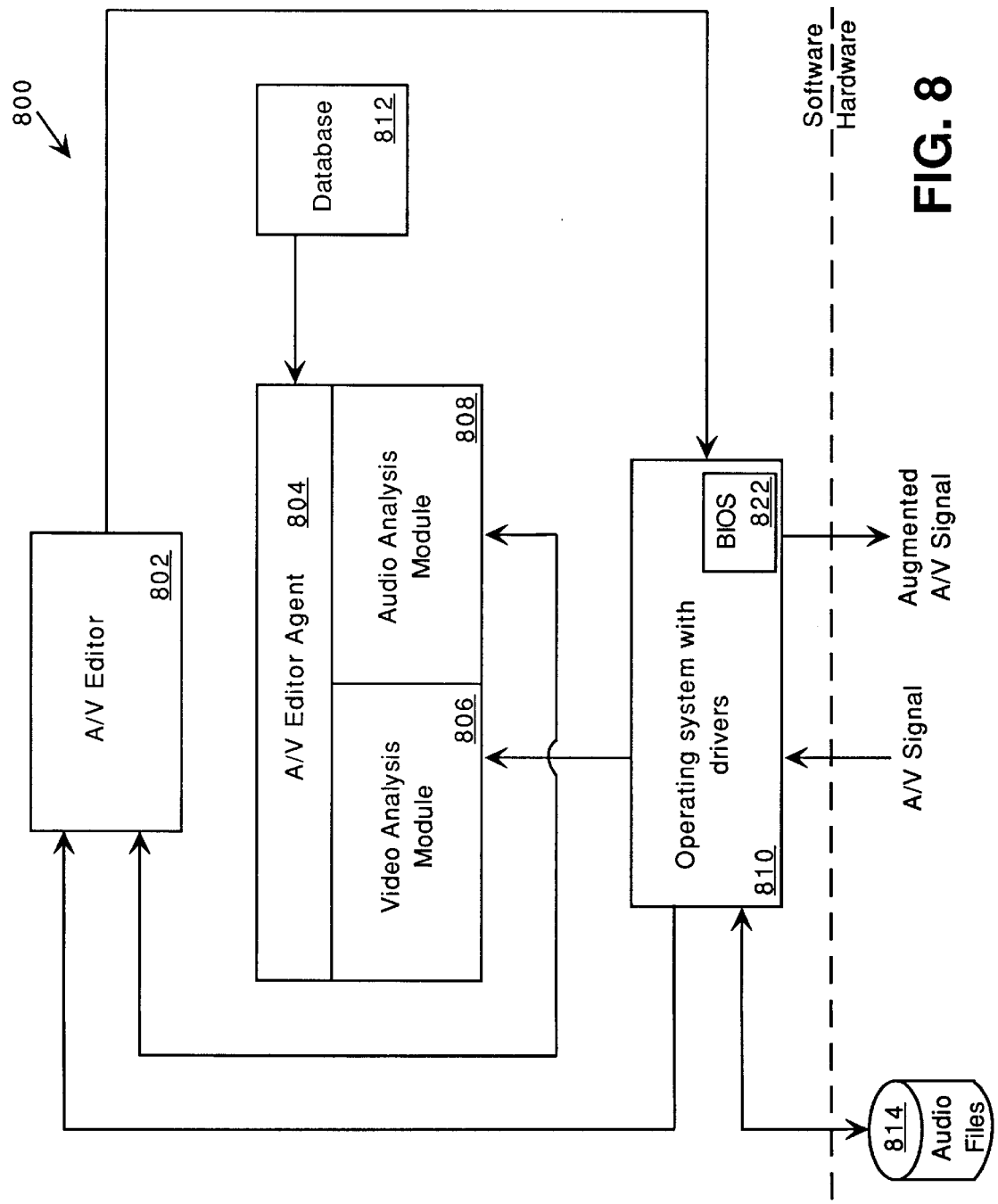
FIG. 8 is a block diagram illustrating an example software architecture for implementing an A/V editing system, in accordance with one embodiment of the present invention.

FIG. 8 is a block diagram illustrating the software elements comprising an example software architecture in accordance with one embodiment of the present invention. In particular, example software architecture 800 is shown comprising A/V editor application 802, A/V editor agent 804 with associated video analysis module 806 and audio analysis module 808, and an operating system 810 with associated drivers, and BIOS 822. As depicted in the illustrated example embodiment of FIG. 8, A/V editor application 802 interfaces with A/V editor agent 804 and provides the user interface for A/V editing system 128 of FIG. 1.

In one embodiment, A/V editor agent 804 is coupled to and able to obtain information from database 812 and audio files 814. In an alternate embodiment, audio files 814 and/or database 812 are integrated modules of A/V editor agent 804. As depicted in FIG. 8, A/V editor agent 804 receives a video signal through a communication port via an appropriate driver within operating system 810. In one embodiment, video analysis module 806 performs the steps of analyzing the video content of the received A/V signal for any of a number of visual attributes, while audio analysis module 808 analyzes the audio content of the received A/V signal (e.g., the primary audio content), if any, to determine the relative level (e.g., volume) at which the audio selection is to be recorded, in accordance with the teachings of the present invention described above. Based, at least in part, on input from video analysis module 806 A/V editor 804, accessing database 812, identifies an audio selection which substantially corresponds with the identified visual attributes of the video content of the received signal, and upon user approval of the identified audio selection, A/V editor 802 combines the received A/V signal with the identified audio selection, at a level automatically selected by audio analysis module 208, to provide a composite A/V signal including the augmented audio selection which is output through an appropriate driver of operating system 810.

As alluded to above, BIOS 822 provides an interface between operating system 810 and the various I/O devices coupled to the hardware system. Operating system 810 is a software service which provides an interface between BIOS 822 and A/V editor agent 804 as well as other software applications, if any, being executed by a computer system within which the present invention is practiced (e.g., system 700). Operating system 810 provides an interface, such as a graphical user interface (GUI), between the user and the system controller. According to one embodiment of the present invention, operating system 810 is the Windows™ 95 operating system, available from Microsoft Corporation of Redmond, Wash. However, it is to be appreciated that the present invention may be used with any other conventional operating system, such as, for example, other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or the UNIX operating system, available from Santa Cruz Operations of Santa Cruz, Calif.

Thus, in accordance with the teachings of the present invention, an A/V editing system analyzes the video content of a video recording and, based at least in part on the visual attributes of the video content, automatically identifies an audio selection with which to augment the video recording, at a recording level automatically selected by the A/V editing system that does not overwhelm the primary audio content, if any, of the video recording.

While the method and apparatus of the present invention has been described in terms of the above illustrated embodiments, those skilled in the art will recognize that the invention is not limited to the embodiments so described. The present invention can be practiced with modification and alteration within the spirit and scope of the appended claims. For example, although depicted as separate components, A/V editing system 128 may well be incorporated into any of the system components (e.g., a television/monitor/video cassette recorder/playback device) within system 100. Further, A/V editing system 128 may not include all of the elements depicted in FIGS. 2 or 7, or may, alternatively, include additional elements without deviating from the scope and spirit of the present invention. Accordingly, the description is to be regarded as illustrative instead of restrictive on the present invention.

Thus, a method and apparatus for editing a video recording with audio selections has been described.

What is claimed is:

1. A machine implemented method comprising:
   (a) receiving a signal including video content;
   (b) analyzing the video content of the received signal to identify plural video regions of the video content; and
   (c) identifying an appropriate audio selection from a plurality of available audio selections with which to augment the received signal based, at least in part, on the identified video regions of the video content.

2. The method of claim 1, further comprising:
   (d) augmenting the received signal with the identified audio selection to form a composite audio/video (A/V) signal comprising at least the video content and the identified audio selection.

3. The method of claim 1, wherein (b) analyzing the video content of the received signal includes characterizing the video content of the received signal in terms of an attribute selected from a set comprising: color visual attributes, lighting visual attributes, or motion visual attributes.

4. The method of claim 1, wherein (b) analyzing the video content of the received signal includes
   characterizing the video content of the plural regions in terms of lighting visual attributes.

5. The method of claim 1, wherein (b) analyzing the video content of the plural regions includes
   characterizing the video content of the received signal in terms of motion visual attributes.

6. The method of claim 1, further comprising quantizing plural regions of the video content of the received signal, said quantizing comprising at least one of:
   (b.1) characterizing the plural regions of the received signal in terms of color visual attributes;
   (b.2) characterizing the plural regions of the received signal in terms of lighting visual attributes; and
   (b.3) characterizing the plural regions of the received signal in terms of motion visual attributes.

7. The method of claim 1, further comprising:
   (d) identifying a recording level at which to augment the received signal with the identified audio selection.

8. The method of claim 7, further comprising:
   (e) augmenting the received signal with the identified audio selection to form a composite audio/video (A/V) signal comprising at least the video content and the identified audio selection.

9. The method of claim 7, wherein (d) identifying a recording level comprises:
   (d.1) determining whether the received signal includes audio content;
   (d.2) identifying audio attributes which characterize the audio content, if it is determined that the received signal includes audio content; and (d.3) selecting a recording level at which to augment the audio content of the received signal with the identified audio selection.

10. An apparatus comprising:
an input port through which the apparatus receives a signal having video content;
a splitter, coupled to the input port, for splitting the video content into plural regions;
a video analysis circuit, coupled to the input port, operative to analyze the plural regions to identify visual attributes of the plural regions; and
a controller, coupled to the video analysis circuit, operative to identify and retrieve an appropriate audio selection from a plurality of audio selections with which to augment the received signal based, at least in part, on the identified visual attributes of the plural regions.

11. The apparatus of claim 10, further comprising a mass storage device, coupled to the controller, operative to store and retrieve each of the plurality of audio selections.

12. The apparatus of claim 10,
wherein the video analysis circuit is operative to quantify color visual attributes of the plural regions.

13. The apparatus of claim 10,
wherein the video analysis circuit is operative to identify lighting visual attributes of the plural regions.

14. The apparatus of claim 10,
wherein the video analysis circuit is operative to identify motion visual attributes of the plural regions.

15. The apparatus of claim 10,
wherein the video analysis circuit is operative to identify color visual attributes, lighting visual attributes and motion visual attributes of the plural regions.

16. The apparatus of claim 10, wherein the controller is operative to mix the identified audio selection with primary audio content of the received signal, if any, at an automatically identified recording level.

17. The apparatus of claim 16, further comprising an audio analysis circuit, coupled to the input port and to the controller, operative to analyze primary audio content of the received signal, if any, to identify audio attributes of the primary audio content.

18. The apparatus of claim 17, wherein the audio analysis circuit is operative to select and supply to controller a recording level for the identified audio selection based, at least in part, on the identified audio attributes of the primary audio content.

19. The apparatus of claim 10, wherein the plurality of audio selections are stored in a remote audio system, communicatively coupled to apparatus through an audio interface, wherein the controller is operative to identify and retrieve appropriate audio selections from the remote audio system through the audio interface.

20. The apparatus of claim 10, wherein the plurality of audio selections are stored in a network server, communicatively coupled to the apparatus through a network connection, wherein the controller is operative to identify and retrieve appropriate audio selections from the network server through the network connection.

21. A video editing system comprising:
an input port through which the editing system receives a signal having plural regions of video content;
a video analysis circuit, coupled to the input port, operative to analyze the plural regions of the received signal to identify visual attributes of the plural regions; and
a controller, coupled to the video analysis circuit, operative to identify and retrieve an appropriate audio selection from a plurality of audio selections with which to augment the received signal based, at least in part, on the identified visual attributes of the plural regions.

22. The editing system of claim 21, further comprising a mass storage device, coupled to the controller, operative to store and retrieve each of the plurality of audio selections.

23. The editing system of claim 21,
wherein the video analysis circuit is operative to quantify attributes selected from a set consisting of:
color visual attributes of the video content,
lighting visual attributes of the video content, and motion visual attributes of the video content.

24. The editing system of claim 21, wherein the controller is operative to mix the identified audio selection with primary audio content of the received signal, if any, at an automatically identified recording level.

25. The editing system of claim 21, further comprising an audio analysis circuit, coupled to the input port and to the controller, operative to analyze primary audio content of the received signal, if any, to identify audio attributes of the primary audio content.

26. The editing system of claim 25, wherein the audio analysis circuit is operative to select and supply to controller a recording level for the identified audio selection based, at least in part, on the identified audio attributes of the primary audio content.

27. The editing system of claim 21, wherein the plurality of audio selections are stored in a remote audio system, communicatively coupled to editing system through an audio interface, wherein the controller is operative to identify and retrieve appropriate audio selections from the remote audio system through the audio interface.

28. The editing system of claim 21, wherein the plurality of audio selections are stored in a network server, communicatively coupled to the editing system through a network connection, wherein the controller is operative to identify and retrieve appropriate audio selections from the network server through the network connection.

29. An electronic appliance comprising:
a primary audio/video (A/V) functional unit, operative to supply a signal including video content; and
an adjunct video editing system, responsive to the primary A/V functional unit, the adjunct video editing system including
an input port, coupled to the primary A/V functional unit, for receiving the signal having video content,
a splitter for splitting the video content into plural regions;
a video analysis circuit, coupled to the input port, operative to analyze the plural regions to identify visual attributes of the video content, and
a controller, coupled to the video analysis circuit, operative to identify and retrieve an appropriate audio selection from a plurality of audio selections with which to augment the received signal based, at least in part, on the identified visual attributes of the plural regions.

30. The electronic appliance of claim 29, wherein the electronic appliance is selected from the set consisting of a television, a computer, a set-top box, a computer television transceiver, and a computer audiovisual program.

31. The electronic appliance of claim 29, wherein the electronic appliance is a video recorder/playback device.

32. The electronic appliance of claim 29, wherein the adjunct video editing system further comprises an audio analysis circuit, coupled to the input port, operative to analyze primary audio content contained within the received signal, if any, to identify audio attributes of the primary audio content.

33. The electronic appliance of claim 32, wherein the audio analysis circuit identifies an appropriate recording level with which to augment the received signal with the identified audio selection based, at least in part, on the identified audio attributes of the primary audio content.

34. The electronic appliance of claim 29, wherein the adjunct video editing system is operative to augment the received signal with the identified audio selection to produce a composite audio/video (A/V) signal including at least the video content and the identified audio selection.

35. A machine readable medium having stored thereon a plurality of instructions for implementing video editing services,
wherein the video editing services include
a service for analyzing video content of a received signal to identify visual attributes of the video content,
a service for splitting the video content into plural regions; and
a service for identifying an appropriate audio selection from a plurality of available audio selections with which to augment the video content of the received signal based, at least in part, on the identified visual attributes of the plural regions.

36. The machine readable medium of claim 35, wherein the video editing services further include a service for analyzing primary audio content of the received signal, if any, to identify audio attributes of the primary audio content and, based at least in part, to identify an appropriate recording level with which to augment the received video recording with the identified audio selection.

37. The machine readable medium of claim 35, wherein the video editing services further include a service for augmenting the received signal with the identified audio content to produce a composite audio/video (A/V) signal comprising at least the video content and the identified audio content.

38. A computing-device readable medium having instructions encoded thereon to direct a processor to perform the operations of:
receiving a signal including video content and audio content;
splitting the video content into plural regions;
analyzing the video content of the plural regions to identify visual attributes of the video content;
identifying an appropriate audio selection from a plurality of locally available audio selections, said selection based on the identified visual attributes of the video content; and
augmenting the audio content with an identified locally available audio selection.

39. A computing-device readable medium having instructions encoded thereon to direct a processor to perform the operations of:
an input port through which the apparatus receives a signal having video content;
a splitter, coupled to the input port, for splitting the video content into plural regions;
a video analysis circuit, coupled to the input port, operative to analyze the plural regions to identify visual attributes of the plural regions; and
a controller, coupled to the video analysis circuit, operative to identify and retrieve an appropriate audio selection from a plurality of audio selections with which to augment the received signal based, at least in part, on the identified visual attributes of the plural regions.

* * * * *

UNITED STATES PATENT AND TRADEMARK OFFICE
CERTIFICATE OF CORRECTION

PATENT NO.    : 6,067,126
DATED         : May 23, 2000
INVENTOR(S)   : Alexander It is certified that error appears in the above-identified patent and that said Letters Patent is hereby corrected as shown below:

Column 10,
Line 14, delete "networkl/communication", insert -- network/communication --.
Line 16, delete "network/commnunication", insert -- network/communication --.
Line 54, delete "network/commmunication", insert -- network/communication --.

Column 13,
Line 17, after "comprising", insert -- : --.

Signed and Sealed this

First Day of October, 2002

Attest:

Attesting Officer

JAMES E. ROGAN
Director of the United States Patent and Trademark Office